Sept. 12, 1961 F. ADAMS 2,999,567
VEHICLE BRAKE
Filed Aug. 19, 1959 3 Sheets-Sheet 1

INVENTOR.
Fred Adams
BY
HIS ATTORNEY

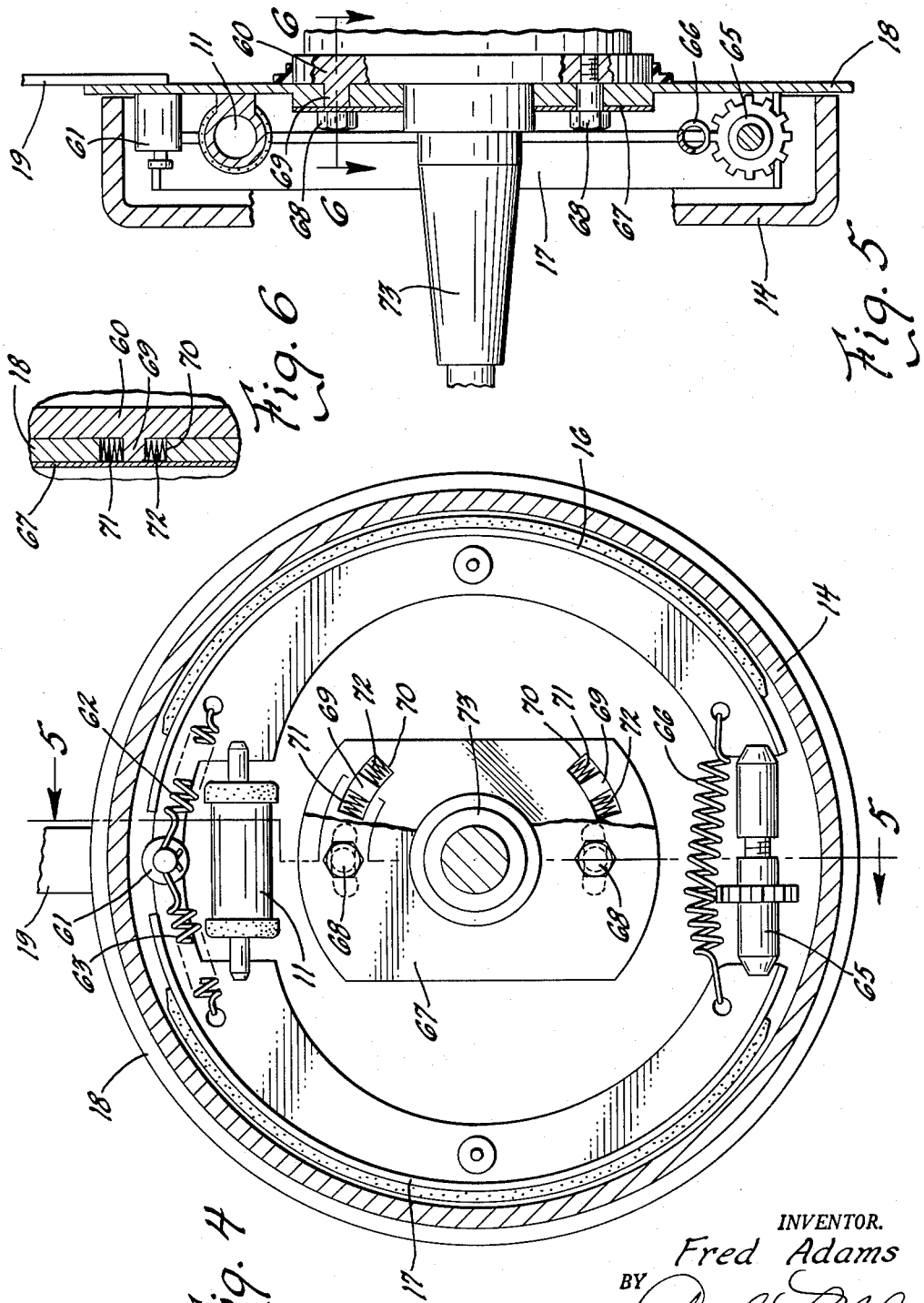

United States Patent Office 2,999,567
Patented Sept. 12, 1961

2,999,567
VEHICLE BRAKE
Fred Adams, Clawson, Mich., assignor to General Motors Corporation, Detroit, Mich., a corporation of Delaware
Filed Aug. 19, 1959, Ser. No. 834,876
7 Claims. (Cl. 188—181)

This invention relates to a vehicle drum brake and more particularly to a means for overcoming skidding of the vehicle wheels during braking.

It is a known fact that braking efficiency is reduced considerably when the vehicle wheels are skidding on the road surface. Control of the vehicle is also difficult under these conditions. When a vehicle wheel skids, the road torque or wheel torque on that particular wheel is reduced. Accordingly, this invention is intended to overcome skidding of the vehicle wheel through a hydraulic means responsive to the wheel torque for each of the wheels.

It is an object of this invention to overcome the skidding of the vehicle wheels during the braking cycle.

It is another object of this invention to provide a hydraulic means for relieving the brake actuating pressure when the vehicle wheel is skidding.

It is a further object of this invention to provide a hydraulic valve operating within the hydraulic brake actuating system. The hydraulic valve is operated by a force responsive to hydraulic pressure in the brake fluid actuating system and an opposing force responsive to the brake torque. The valve relieves the actuating pressure to the braking means to temporarily overcome the skidding condition on the vehicle wheel.

The objects of this invention will be accomplished by means of placing a spool valve in the hydraulic fluid actuating line to each of the four wheels of the motor vehicle. The actuating pressure biases the spool valve in one direction. The brake torque through a hydraulic medium biases the spool valve in the opposite direction. A check valve is also in communication with the spool valve which relieves pressure from the spool valve and permits limited return of fluid to the reservoir. During normal brake operation, the spool valve permits pressurization of the fluid actuating means in the vehicle brake. When a skidding condition exists the spool valve moves to a second position relieving the pressure on the actuating means in the vehicle brake and venting the pressure to the hydraulic master cylinder reservoir. When the brake torque again reaches a normal value the fluid actuating system is again open to permit normal braking conditions.

Further objects and advantages of the present invention will be apparent from the following description, reference being had to the accompanying drawing wherein preferred embodiments of the invention are clearly shown.

In the drawings:

FIGURE 4 is a cross-section view of the vehicle drum brake showing the relative positions of the various parts within the brake.

FIGURE 5 is a cross-section view taken on line 5—5 of FIGURE 4.

FIGURE 6 is a fragmentary view taken on line 6—6 of FIGURE 5.

Figure 1:
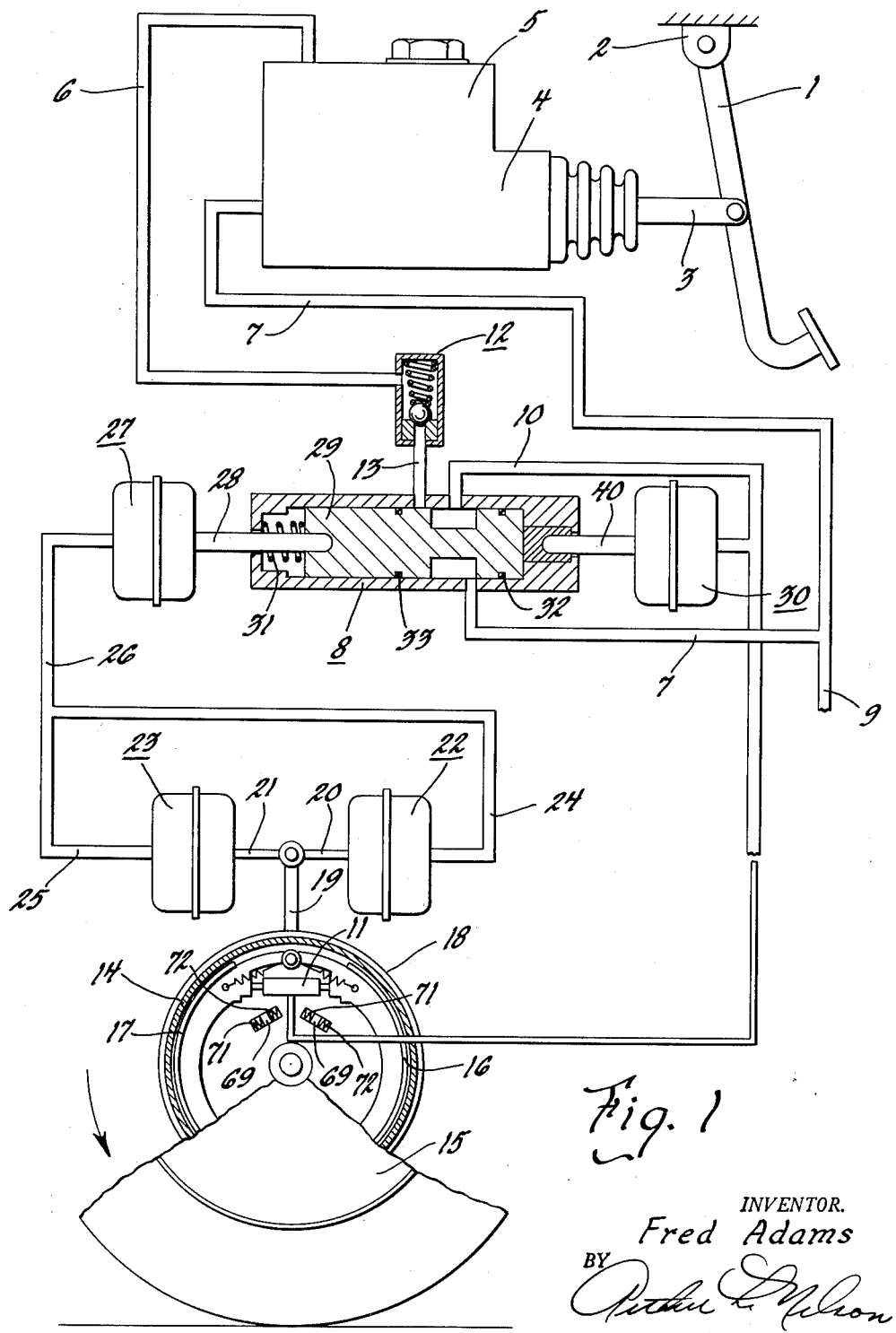
FIGURE 1 is a schematic view of the device for overcoming the skidding condition on each of the four wheels.

FIGURE 1 illustrates the schematic diagram of the hydraulic brake actuating fluid system. This system is intended to operate a vehicle drum brake having a backing plate which can rotate annularly relative to the support for the brake mechanism. The spool valve and check valve are shown in cross section.

In FIGURE 1 a vehicle brake lever 1 is pivotally supported to the chassis 2. The brake lever 1 is also pivotally connected to the push rod 3 which extends to the master cylinder 4. The master cylinder is of a conventional type having a reservoir 5 on the upper portion of the casting. The reservoir 5 also has a conduit means 6 leading into its upper portion.

The master piston, not shown, pressurizes fluid within the master cylnider. The fluid pressurized within the master cylinder 4 is in communication with the conduit means 7 which leads to a valve cylinder 8. A valve cylinder 8 is provided for each of the four wheels on the vehicle and the conduit 9 leads to a plurality of such valve cylinders. As shown in FIGURE 1, the conduit means 7 is in communication with conduit means 10. The conduit 10 leads to the hydraulic wheel cylinder 11 which provides the actuating means for the vehicle drum brake as shown.

The conduit 6 is in communication with the check valve 12. The check valve 12 maintains a residual pressure in the conduit 13 which leads into the valve cylinder 8. The vehicle drum brake as shown in FIGURE 1 includes the drum 14 mounted on the wheel 15. Two brake shoes 16 and 17 are mounted for engaging the inner periphery of the drum 14. The brake shoes and the wheel cylinder 11 are mounted on a backing plate 18. The backing plate 18 is mounted for limited pivoting movement relative to the support flange 60. The backing plate 18 is also connected to an arm 19. The arm 19 pivotally engages the push rods 20 and 21. The push rods 20 and 21 operate their relative torque sensing units 22 and 23. Torque sensing units 22 and 23 form a closed fluid system through conduits 24, 25 and 26 together with the torque control unit 27. The torque control unit 27 is provided with a push rod 28 engaging the left side of the spool valve 29. A pressure control unit 30 is mounted on the right hand end of the spool valve 29.

The spool valve 29 is mounted within the valve cylinder 8 and is biased to the right hand end by the spring 31. A seal 32 is mounted in an annular groove about the outer periphery of the spool valve 29 and engages the inner periphery of the cylinder 8. A similar seal 33 is mounted in an annular groove in an intermediate portion of the spool valve 29. The valve as shown is provided with an annular recess to provide communication between conduit 7 and 10 when the spool valve is in the right hand position. When the spool valve is in the left hand position the conduit 10 is in communication with conduit 13.

Figure 2:
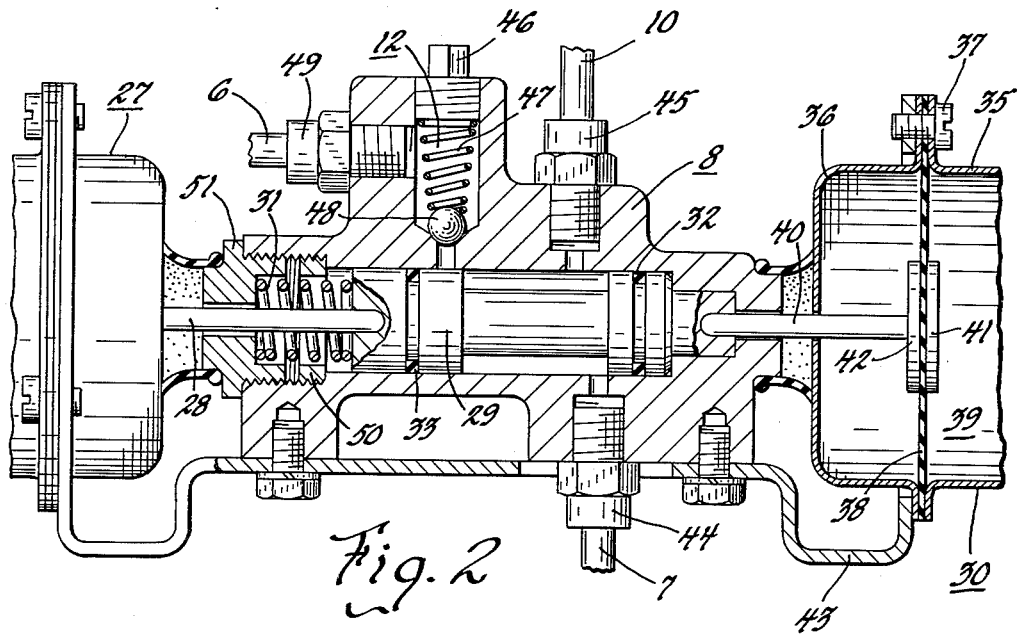
FIGURE 2 is a cross-section view of the spool valve and the control units controlling the position of the spool valve.

Referring to FIGURE 2, the spool valve 29 and valve cylinder 8 are shown in cross section in connection with the torque control unit 27 and the pressure control unit 30. The pressure control and torque control units are similarly constructed of which the construction is shown on the pressure control unit 30. The pressure control unit includes two casing segments 35 and 36 bolted together by a plurality of bolts 37. The diaphragm 38 is mounted between the two sections 35 and 36. The outer end forms a chamber 39 which is filled with hydraulic fluid in communication with the brake fluid actuating system. The diaphragm 38 forms a flexible wall for the fluid chamber 39. The diaphragm 38 is connected to the push rod 40 through the disks 41 and 42. The push rod 40 extends axially into the valve cylinder 8. The end of the push rod 40 engages the spool valve 29.

The pressure control unit 30 is mounted on a bracket 43 which also supports the valve cylinder 8 and the torque control unit 27.

The conduit means 7 is connected to the valve cylinder 8 by means of the fitting 44. The conduit 10 is connected to the valve cylinder 8 by the fitting 45. The check valve 12 is shown as a part of the casting of the valve cylinder 8 and is formed in the upper portion of this casting. The check valve 12 includes a threaded plug 46 providing a seating means for a spring 47 engaging the ball 48 which forms the valve of the check valve 12. A conduit 6 is connected to the upper portion of the check valve 12 by the fitting 49.

The spool valve 29 is biased to the right hand position by the spring 31. This is a normal position for the spool valve when the vehicle brakes are actuated and the wheel is not skidding.

The left hand end of the valve cylinder 8 is provided with a threaded adjustable stop 50. The stop 50 determines the limit of left hand movement of the spool valve 29. A hollow end plug 51 threadedly engages the left hand end and inner periphery of valve cylinder 8 and also provides a seat for the spring 31.

Figure 3:
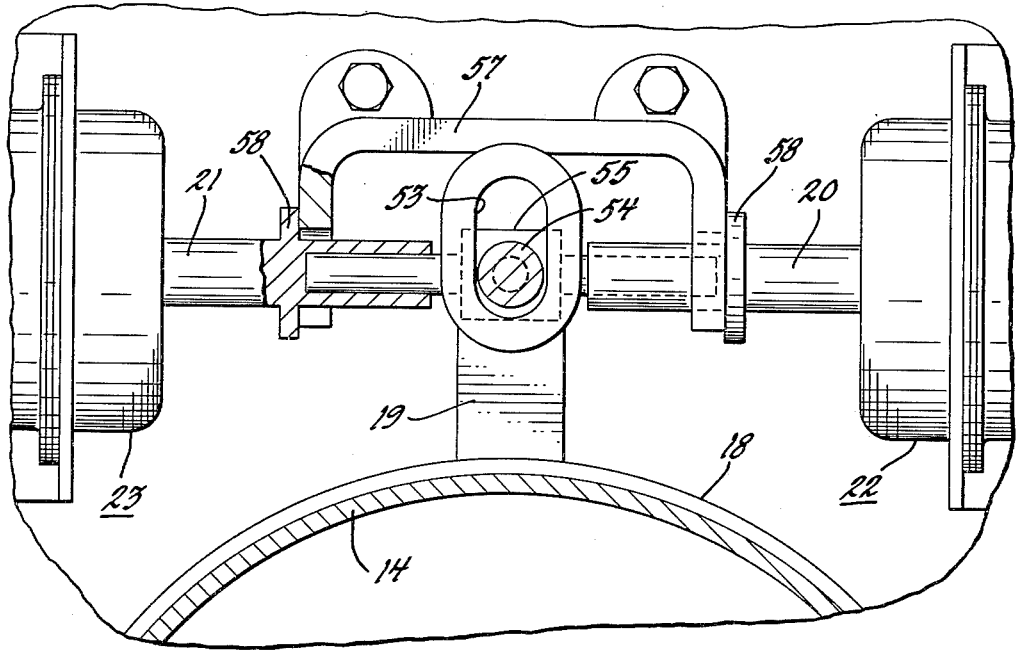
FIGURE 3 is an enlarged view of a portion of the vehicle drum brake and the torque sensing units.

FIGURE 3 illustrates an enlarged view of the torque sensing units 22 and 23. These two units are of the same construction as illustrated by the cross section portion of the pressure control unit 30 in FIGURE 2. The backing plate 18 is fastened to the torque arm 19. The torque arm 19 has an elongated slot 53 for engaging a roller 54 on the rod 55. The rod 55 has an enlarged center portion for providing a mounting means for the roller 54. The end portions of the rod 55 have a reduced diameter fitting within cylindrical end openings in push rods 20 and 21. A supporting member 60 provides a supporting means for the bracket 57. The bracket 57 remains stationary relative to the pivoting torque arm 19. As the vehicle is travelling in the forward direction as indicated by the arrow in FIGURE 1, the torque sensing unit 23 engages the rod 55 as the torque arm 19 rotates. The rotating movement of the torque arm 19 forces the push rod 21 into a sensing unit 23. The shoulder portion 58 on push rod 20 engages the bracket 57. During forward rotation, the shoulder 58 of push rod 20 engaging the bracket 57 prevents any movement of the push rod 20. The pressurization of fluid within the torque sensing unit 23 is thereby transmitted to the torque control unit 27. In forward rotation a torque sensing unit 22 remains inactive. During rearward rotation the reverse situation is true and torque sensing unit 22 operates the torque control unit 27 and the torque sensing unit 23 is inactive.

In referring to FIGURE 4 a vehicle drum brake is shown in cross section to illustrate the relative location of the various parts in the brake structure. The brake drum 14 is concentrically and rotatably mounted relative to the brake supporting flange 60. The brake supporting flange 60 is shown in FIGURE 5. The backing plate 18 is connected to the torque arm 19. The brake shoes 16 and 17 engage the inner periphery of the drum 14. The brake shoes are anchored to the backing plate 18 through the anchor pin 61. The retraction springs 62 and 63 engage the anchor pin 61 and the brake shoes 16 and 17 respectively. The brake shoes are actuated by the hydraulic cylinder 11. An adjustable strut 65 is mounted between the opposite two cooperatively adjacent ends of the brake shoes 16 and 17. A spring 66 also connects these two opposite cooperative adjacent ends of the brake shoes. A cover plate 67 is fastened to the brake supporting flange 60 by means of a plurality of bolts 68. The backing plate 18 is mounted for limited rotation relative to the mounting flange 60. The mounting flange 60 is provided with four lugs 69 on a common radial circle. A mating slot 70 is provided on the backing plate on the same radial circle as the lugs. In assembling, the springs 71 and 72 are placed between the sides of the lug 69 and the ends of the slots 70. The springs are held in the slot by means of the cover plate 67. This provides a resilient mounting for rotational movement of the backing plate 18 relative to the supporting flange 60.

FIGURE 6 shows a fragmentary cross section view showing the cover plate 67 mounted on the supporting flange 60. The slot 70 is shown with the lug 69 in its intermediate position and a spring 71 on one side of the lug bearing against the end of the slot and a spring 72 on the opposite side of the lug bearing against the opposite end of the slot 70.

The wheel shown is for a front wheel with the brake mounting flange 60 cast integral with the spindle 73. The front wheel with the brake drum is rotatably mounted on the spindle 73. The brake shoe 17 is shown mounted adjacent to the backing plate 18. A hydraulic wheel cylinder 11 is mounted on the backing plate 18.

The operation of this device is described in the following paragraphs. A brake master cylinder 4 is operated by the brake lever 1 in a normal fashion. The brake lever 1 operating through the master piston pressurizes fluid within the master cylinder 4 and the wheel cylinder 11 simultaneously with the pressure control unit 30. The wheel cylinder 11 expands the brake shoes to contact the inner periphery of the brake drum at which time the brake actuating fluid system has reached a pressure slightly in excess of that required to overcome the force of the brake retraction springs. Concurrently the brake actuating system has caused the force to be exerted within the chamber 39 of the pressure control unit 30. This force is exerted against the sliding spool valve 29 in opposition to the spring 31 which has so far prevented the spool valve 29 from moving to the left. Any increase in brake actuating fluid pressure forces the sliding spool valve to the left overcoming the biasing force of the spring 31. The brake shoes, however, have already made contact with the inner periphery of the brake drum 14. This initial contact of the brake shoes established the torque absorbed by the backing plate 18.

As the backing plate 18 absorbs the brake torque created by the friction of the shoes on the inner periphery of the drum 14 the arm 19 rotates. This torque is the reaction from the wheel torque or road torque originating by the contact of the tire on the road bed. The reaction torque or brake torque on the backing plate 18 produces a force on the diaphragm of the control sensing unit 23 through torque arm 19. A closed fluid system is provided between the torque sensing unit 23 and the torque control unit 27. The reaction torque received by the torque sensing unit 23 is transmitted through the fluid system to the torque control unit 27. The force transmitted to the torque control unit 27 is transmitted through the push rod 28 which imparts a force on the end of the sliding spool valve 29. The condition now existing is such that the brake torque force opposes the brake pressure force. Under these conditions, the spool valve 29 is held in its normal position to the extreme right hand side of the valve cylinder 8. As long as the wheel torque transmitted to the left hand end of the spool valve 29 by control unit 27 equals or exceeds the force transmitted by the pressure control unit 30 of the right hand side of the spool valve 29 the spool valve will remain in its normal right hand position.

As the brake pedal force increases, the pressure for actuating the vehicle brakes increases due to increased pressure in the master cylinder. Accordingly, the pressure will also increase in the hydraulic wheel cylinder and the pressure control unit. The force transmitted on the right hand end of the spool valve 29 is always less than the force produced on the left hand end due to the continuing increasing brake torque.

Assuming that the tire traction on the road surface is good, the wheel torque will always be a greater value than brake torque for all braking conditions up to the point of tire creep at the threshold of a skid, at which point friction between the tire and the road is at its maximum. Under the above conditions the anti-skid control will not be called upon to operate and, therefore, the spool valve 29 will always remain in its normal right hand position as shown in FIGURE 2.

Should any condition of road surface result in a loss of traction or should the brake shoes tend to lock with the drum, the wheel and tire will stop, the result will be an immediate and definite loss of wheel torque between the tire and the roadway. When this occurs, the brake torque on the backing plate will decrease in proportion to the wheel torque as actually felt by the tire in contact with the road. The torque sensing unit 23 being connected to the backing plate will feel the torque reaction reduced and will accordingly transmit a reduced force through the fluid system to the torque control unit 27.

Assuming the brake actuating fluid pressure to be constant at this instant the force of the pressure control unit 30 remains constant while at the same time the torque control unit 27 is reduced. It can be seen that with a reduced force transmitted through the fluid system to the torque control unit 27 that a corresponding reduction in force will be transmitted to the left hand end of the spool valve 29. This differential of force on the spool valve will allow the spool valve to move in the left hand direction and as the differential of force is great enough the spool valve will seat on the valve stop 50.

From the point of beginning of movement of the spool valve 29 to the left this indicates the beginning of an anti-skid control cycle. The amount of return of movement of the spool valve is dependent upon amount and rate of the differential change between the two opposing forces acting on the opposite ends of the spool valve 29. If the drop in wheel torque is greatly decreased and of sudden occurrence as in a wheel skid the wheel torque in the torque sensing unit 23 will decrease proportionally in a sudden manner. When this occurs a spool valve 29 will be forced to the left by the force of the brake pressure control unit 30 in a sudden and complete manner. Accordingly, the spool valve moves completely to the left compressing the spring 31. The spool valve 29 is so constructed that in the left hand position the hydraulic brake actuating fluid pressure line leading back to the master cylinder 4 is blocked off to prevent loss of brake system pressure in this line, while at the same instant, the sliding spool valve assumes a position which vents the hydraulic wheel cylinder line and the conduit leading to the pressure control sensing unit to atmosphere via the pressure relief check valve 12 back to the reservoir of the master cylinder through the conduit 6. This effectively reduces the portion of the hydraulic fluid actuating system in communication with the hydraulic wheel cylinder to a value which is determined by the seating of the relief valve 12, but does not allow the pressure to drop to zero. The reason for this being that the maintenance of a slight residual pressure in the wheel cylinder does not permit brake shoes to fully retract away from the drum, and at the same time the brake releases to the point where a certain definite minimum braking torque will permit turning of the wheel immediately.

The next immediate action desired is a recovery cycle. The spool valve 29 immediately returns to the right hand side or normal position within the valve cylinder 8. This return of the spool valve, however, is dependent upon the wheel torque which may vary according to road conditions as sensed by the torque sensing unit 23. A full recovery cycle of the spool valve is accomplished by action of the spring 31 which is preloaded to a value designed to overcome a force caused by the residual pressure in the pressure control unit 30.

The above description of the operation includes the manner in which the anti-skid device operates for all conditions of maximum and minimum wheel torque for a full cycle control of the spool valve. For any condition prevailing between the extreme conditions of wheel torque, the operation of the sliding spool valve is such that any change in the differential between the brake actuating fluid pressure and the wheel torque is balanced by bleeding off of brake pressure from the wheel cylinder to compensate for decrease in brake wheel torque during conditions where the road coefficients of friction is of a decreasing nature. Conversely, where road coefficients are such that the wheel torque is of an increasing nature, the spool valve acts to bleed in brake actuating fluid pressure to compensate for increase in wheel torque. Obviously, the spool valve design and the design of the wheel torque sensing system must be matched to the conditions expected to effect wheel torque of available conditions of road coefficient, and, brake pedal pressures that will vary from minimum to maximum for normal and panic stop applications.

Although the major concern for an anti-skid device is in forward direction, the applicant's device provides for anti-skid in the forward and rearward direction of rotation of the vehicle wheel. When the vehicle is moved in the rearward direction and the brakes are applied the torque sensing unit 23 is not used. A torque sensing unit 22 is then in operation. The operation of the fluid system transmitting the force from the torque sensing unit 22 operates in the same manner as previously described for forward rotation.

While the embodiments of the invention as herein disclosed constitute preferred forms, it is to be understood that other forms might be adopted.

What is claimed is as follows:

1. In a device of the character described comprising in combination, a hydraulic fluid brake actuating system including means for pressurizing fluid, a vehicle drum brake including hydraulic means for actuating said brake in communication with said hydraulic fluid brake actuating system, a rotating brake drum connected to a vehicle wheel, a brake support member, a backing plate mounted for limited rotation on said brake support member, brake shoes mounted within said rotating drum for engagement with the inner periphery of said drum, a torque sensing means connected to said backing plate, a torque control means connected to said torque sensing means through a hydraulic means, a control valve mounted in said hydraulic fluid brake actuating system, a pressure control means mounted in said hydraulic brake fluid actuating system biasing said control valve to a closed position, said torque control means biasing said control valve to a normally open position for normal brake operation when said vehicle wheel is rotating normally, said pressure control means biasing said valve to a closed position to reduce the pressure in the hydraulic brake actuating means when said wheel is skidding and thereby relieve brake actuating fluid pressure and permit normal rotation of said vehicle wheel.

2. In a device of the character described comprising in combination, a hydraulic fluid brake actuating system having means for pressurizing fluid, a vehicle drum brake including hydraulic means for actuating said drum brake in communication with said hydraulic fluid brake actuating system, a brake support member, a backing plate mounted for limited rotational movement relative to said support member, a drum and wheel rotatably mounted relative to said backing plate, brake shoe means mounted within said brake drum for engagement with said drum, a torque sensing motor unit connected to said backing plate, a torque control motor unit connected to said torque sensing motor unit by hydraulic means, a control valve in said hydraulic fluid brake actuating system, a pressure control motor unit in said hydraulic fluid brake actuating system biasing said valve to a closed position, said torque control motor unit biasing said valve to a normally open position when said vehicle wheel is rotating normally, said torque control motor unit transmitting a reduced force when the torque from said backing plate is reduced due to the skidding of the vehicle wheel thereby permitting said pressure control motor unit to shift said valve means to a closed position reducing the pressure in said hydraulic fluid brake actuating means and permitting said vehicle wheel to again rotate normally.

3. In a device of the character described comprising in combination, a hydraulic brake actuating system having means for pressurizing fluid, a vehicle drum brake including hydraulic means for actuating said brake in communication with said hydraulic fluid system, a brake support member, a backing plate mounted for limited rotational movement relative to said brake support member, a drum connected to a wheel rotating concentrically with said backing plate, brake shoe means mounted within for engagement with said rotating drum, a brake torque sensing unit mounted on said brake supported member and connected to said backing plate, a torque control unit hydraulically connected to said torque sensing unit, a brake control valve in said hydraulic fluid brake actuating system, a pressure control unit in said hydraulic brake actuating system biasing said valve to a closed position, said torque control unit biasing said valve to a normally open position when said vehicle wheel is rotating normally, a check valve for maintaining a residual pressure in said hydraulic means, said pressure control unit biasing said control valve to a closed position placing said hydraulic actuating means in communication with said check valve thereby reducing the braking on said vehicle wheel to permit the wheel to again rotate in a normal manner.

4. In a device of the character described comprising in combination, a hydraulic fluid brake actuating system including means for pressurizing fluid, a vehicle drum brake having hydraulic means for actuating in communication with said hydraulic fluid brake actuating system, a brake support means, a backing plate mounted for limited rotational movement relative to said support means, a brake drum rotatably mounted relative to said backing plate, brake shoes mounted within for engagement with said rotating drum, torque sensing fluid pressurizing unit mounted on said brake support member and connected to said backing plate, a hydraulic control valve for controlling the fluid pressure to said hydraulic actuating means, said control valve in communication with said hydraulic fluid brake actuating system, a torque control fluid operated unit hydraulically connected to said torque sensing unit biasing said control valve to a normally open position to provide normal brake fluid pressure in said hydraulic actuating means, a pressure control fluid operated unit in said hydraulic brake fluid actuating system biasing said control valve to a closed position and thereby reducing the pressure in said hydraulic actuating means when the vehicle wheel is in a skidding condition.

5. In a device of the character described comprising in combination, a hydraulic fluid brake actuating system having means for pressurizing fluid, a vehicle drum brake including hydraulic means for actuating said brake in communication with said hydraulic fluid brake actuating system, a brake support member, a backing plate mounted for limited rotational movement relative to said support member, a brake drum and wheel rotatably mounted relative to said support member, brake shoe means mounted within said brake drum for engagement with the inner periphery of said drum, an arm connected to said backing plate, a torque sensing unit for operation with forward rotation of said wheel, a torque sensing unit for operation with rearward movement of said wheel, a rod connected to said arm for selective operation of said forward and said rearward torque sensing unit depending upon the rotation of said wheel, a valve means in said hydraulic fluid brake actuating system, a torque control unit connected to said torque sensing units by hydraulic means, said torque control unit biasing said valve to a normally open position to permit normal fluid pressure for actuation of said hydraulic means in said brake when said wheel is rotating normally, a fluid pressure unit in said hydraulic fluid brake actuating system biasing said valve to a closed position when said wheel is not rotating normally and thereby reducing the pressure in said hydraulic actuating means of said brake when said wheel is not rotating normally to thereby reduce brake torque and permit normal rotation of said vehicle wheel.

6. In a device of the character described comprising in combination, a hydraulic actuating system having means for pressurizing fluid, said means for pressurizing fluid including a master cylinder having a reservoir, a vehicle drum brake including hydraulic means for actuation of said brake in communication with said hydraulic fluid brake actuating system, a brake support member, a backing plate mounted for limited rotational movement relative to said support member, a drum and wheel rotatably mounted relative to said support member, brake shoe means mounted for frictional engagement with said rotating drum, torque sensing means connected to said backing plate, a torque control unit connected to said torque sensing means by hydraulic means, a pressure control valve in said hydraulic fluid brake actuating system, a pressure control unit in said hydraulic fluid brake actuating system, a conduit means connecting said control valve to said reservoir of said master cylinder, a check valve in said conduit means to maintain a residual pressure in said control valve, said torque control unit biasing said control valve to a normally open position to permit equal fluid pressure in said hydraulic master cylinder and said hydraulic actuating means of said vehicle brake when said vehicle wheel is rotating normally, said pressure control unit biasing said control valve to a normally closed position to reduce the pressure in said hydraulic actuating means to the residual pressure maintained by said check valve, thereby reducing the torque on said vehicle brake and permitting normal rotation of said vehicle wheel.

7. In a device of the character described comprising in combination, a hydraulic fluid brake actuating system having means for pressurizing fluid, said means for pressurizing fluid including a hydraulic master cylinder and a hydraulic master piston, a fluid reservoir in communication with said hydraulic master cylinder, a vehicle drum brake including hydraulic means for actuation of said brake in communication with said hydraulic fluid brake actuating system, a brake support member, a backing plate mounted for limited rotational movement relative to said support member, a drum and wheel rotatably mounted relative to said support member, brake shoe means mounted for frictional engagement with said drum, a torque sensing means connected to said backing plate, a torque control unit connected to said torque sensing means by hydraulic fluid means, a control valve in said hydraulic fluid brake actuating system, a pressure control unit in said hydraulic fluid brake actuating system, conduit means connecting said control valve to said reservoir of said master cylinder, a check valve in said conduit means for maintaining a residual pressure in said control valve, said torque control unit biasing said control valve to a normally open position for normal actuation of said vehicle brake when said wheel is rotating normally, said pressure control unit biasing said control valve to a normally closed position when said wheel is skidding thereby restricting communication between said master cylinder and said hydraulic brake actuating means and placing said hydraulic brake actuating means in communication with said check valve to reduce the fluid pressure in the hydraulic brake actuating means and reduce the torque of said vehicle brake and permit normal rotation of said vehicle wheel.

References Cited in the file of this patent

UNITED STATES PATENTS

| | | |
|---|---|---|
| 2,107,823 | Hallot | Feb. 8, 1938 |
| 2,185,003 | Stoddard | Dec. 26, 1939 |
| 2,423,057 | Thomas et al. | June 24, 1947 |
| 2,517,078 | Billon | Aug. 1, 1950 |
| 2,736,395 | Keeler | Feb. 28, 1956 |
| 2,809,309 | Evans | Oct. 8, 1957 |